(12) United States Patent
Park et al.

(10) Patent No.: US 11,010,557 B2
(45) Date of Patent: May 18, 2021

(54) APPARATUS AND METHOD FOR EXTRACTING NICKNAME LIST OF IDENTICAL USER IN ONLINE COMMUNITY

(71) Applicant: SOGANG UNIVERSITY RESEARCH FOUNDATION, Seoul (KR)

(72) Inventors: Seog Park, Seoul (KR); Sanghyun Park, Seoul (KR)

(73) Assignee: SOGANG UNIVERSITY RESEARCH FOUNDATION, Seoul (KR)

(*) Notice: Subject to any disclaimer, the term of this patent is extended or adjusted under 35 U.S.C. 154(b) by 129 days.

(21) Appl. No.: 16/340,551

(22) PCT Filed: Dec. 4, 2017

(86) PCT No.: PCT/KR2017/014108
§ 371 (c)(1),
(2) Date: Apr. 9, 2019

(87) PCT Pub. No.: WO2018/105979
PCT Pub. Date: Jun. 14, 2018

(65) Prior Publication Data
US 2020/0050663 A1    Feb. 13, 2020

(30) Foreign Application Priority Data
Dec. 7, 2016 (KR) .................. 10-2016-0166144

(51) Int. Cl.
*G06F 40/30* (2020.01)
*G06F 40/295* (2020.01)
(Continued)

(52) U.S. Cl.
CPC ............. *G06F 40/295* (2020.01); *G06N 5/04* (2013.01); *G06F 16/958* (2019.01); *G06F 40/30* (2020.01);
(Continued)

(58) Field of Classification Search
CPC ... G06F 16/958; G06F 40/30; H04L 63/0421; H04L 63/102; H04L 67/306
See application file for complete search history.

(56) References Cited

U.S. PATENT DOCUMENTS 6,209,100 B1 * 3/2001 Robertson .............. G06Q 10/10
726/2
9,639,518 B1 * 5/2017 Goodspeed ........... G06F 40/295
(Continued)

FOREIGN PATENT DOCUMENTS

| CN | 105589847 | 5/2016 |
|----|-----------|--------|
| CN | 102315953 | 8/2016 |

(Continued)

OTHER PUBLICATIONS

Gruner, "Tool Support for Plagiarism Detection in Text Documents," ACM 2005. (Year: 2005).*
(Continued)

*Primary Examiner* — Feng-Tzer Tzeng
(74) *Attorney, Agent, or Firm* — Lex IP Meister, PLLC

(57) ABSTRACT

A method of extracting nicknames of identical user by an apparatus operated by at least one processor, the method includes receiving a posting uploaded to an online community from a server; extracting at least one feature information for identifying a posting writer who writes the posting, from the posting; and extracting nicknames of identical user with the posing writer, from a plurality of nicknames, based on similarity of the feature information with a predetermined reference or greater.

14 Claims, 7 Drawing Sheets

(51) Int. Cl.
*G06N 5/04* (2006.01)
*G06N 3/12* (2006.01)
*G06F 16/958* (2019.01)
*H04L 29/08* (2006.01)
*H04L 29/06* (2006.01)

(52) U.S. Cl.
CPC .......... *G06N 3/126* (2013.01); *H04L 63/0421* (2013.01); *H04L 63/102* (2013.01); *H04L 67/306* (2013.01)

(56) References Cited

U.S. PATENT DOCUMENTS

| | | | | |
|---|---|---|---|---|
| 2008/0091684 | A1* | 4/2008 | Ellis | ........................ G06F 16/93 |
| 2011/0184729 | A1* | 7/2011 | Nam | ..................... G06F 16/951 704/9 |
| 2016/0294836 | A1* | 10/2016 | Williams | ............... G06Q 50/01 |

FOREIGN PATENT DOCUMENTS

| | | | |
|---|---|---|---|
| FR | WO 1991011771 | * | 1/1991 |
| FR | WO 1991011771 | * | 8/1991 |
| KR | 10-2010-0001650 | | 1/2010 |
| KR | 10-1224660 | | 1/2013 |
| KR | 10-2013-0091392 | | 8/2013 |
| KR | 10-2015-0031341 | | 3/2015 |
| KR | 10-2015-0101536 | | 9/2015 |
| KR | 10-2016-0119035 | | 10/2016 |

OTHER PUBLICATIONS

Gruner, et al., "Tool Support for Plagiarism Detection in Text Documents," ACM 2005 (Year: 2005).*

Minjae Kim et al., "Measures of Abnormal User Activities in Online Comments Based on Cosine Similarity", Journal of The Korea Institute of Information Security & Cryptology, vol. 24, No. 2, Apr. 2014.

KIPO, International Search Report of PCT/KR2017/014108 dated Mar. 14, 2018.

* cited by examiner (a) cluster1

(b) cluster2

(c) cluster3

(d) cluster4

APPARATUS AND METHOD FOR EXTRACTING NICKNAME LIST OF IDENTICAL USER IN ONLINE COMMUNITY

TECHNICAL FIELD

The present invention relates to an apparatus and method for extracting a nickname list of identical user in online community.

BACKGROUND ART

Thanks to the development of a mobile and wired/wireless network technology, it is possible to access a web without limitations of time and space. Various online services have been released such as social network service (SNS) and an online community.

The social network service is an online service for sharing information by users and communicating with other users. Facebook, Twitter, and Instagram are examples of the social network service.

The online community is an online service for providing spaces in which users produce and share information on common interests and user preference on a web, and gather and work on a web. The online community has been provided from the initial stage of a web.

Along with proliferation of the online SNS, researches have been continuously conducted to analyze social phenomena and predict an election result by using a large amount of texts, images, and location tags that are uploaded by users of online SNS, as analysis materials.

However, in the online community that anonymity is guaranteed, personal information is not obviously revealed, and continuity with the past identity is not guaranteed as a nickname is changed. Accordingly, it is difficult to identify personal information, so data as well as postings of the online community are barely used as various analysis materials.

Because an online community guarantees anonymity, users are capable of posting their frank opinions. Thus, it needs to research for identifying personal information, for making use of data acquired in the online community as various analysis materials.

DISCLOSURE

Technical Problem

An exemplary embodiment provides a method and apparatus for extracting a nickname list of the identical user (the same user), to identify nicknames before change and after change as the identical user's nicknames even if the user changes his or her nickname, in an online community in which anonymity is guaranteed.

Technical Solution

According to an embodiment, a method of extracting nicknames of identical user by an apparatus operated by at least one processor is provided. The method includes receiving a posting uploaded to an online community from a server; extracting at least one feature information for identifying a posting writer who writes the posting, from the posting; and extracting nicknames of identical user with the posing writer, from a plurality of nicknames, based on similarity of the feature information with a predetermined reference or greater.

The method may further include selecting a candidate nickname group by excluding nicknames that are determined not to be the identical user from the plurality of nicknames. The extracting the nicknames may include extracting the nicknames of the identical user from the candidate nickname group.

Nicknames with overlapping used time periods may be determined not to be the identical user from the plurality of nicknames.

The extracting the feature information may include extracting at least one kind of feature information among word related feature information for identifying interest information of the posting writer, activity time related feature information of the posting writer, posting related feature information, and communication relationship related feature information between the posting writer and another user.

The word related feature information may include at least one feature word and a frequency in use of the feature word acquired by using morpheme analysis of texts of the posting.

The communication relationship related feature information may include at least one of first nickname feature information that includes information on a nickname that writes a reply comment or expresses empathy with respect to at least one posting written by the posting writer; second nickname feature information that includes information on a nickname of a writer who writes a posting in response to which the posting writer writes a reply comment or expresses empathy; and third nickname feature information that includes combination of the first nickname feature information and the second nickname feature information.

According to another embodiment, a method of extracting nicknames of the identical user by an apparatus operated by at least one processor is provided. The method includes: receiving postings uploaded to an online community from a server; extracting at least two kinds of feature information from each posting, among word related feature information for identifying interest information of a posting writer, activity time related feature information of the posting writer, posting related feature information, and communication relationship related feature information between the posting writer and another user; calculating a feature information similarity between a plurality of nicknames corresponding to writers of the postings; applying different weight values for each of the feature information to the similarity; and extracting nicknames of identical user, based on the similarity of feature information with a predetermined reference or greater.

The method may further include selecting a candidate nickname group by excluding nicknames that are determined not to be the identical user from the plurality of nicknames. The extracting the nicknames may include extracting the nicknames of identical user from the candidate nickname group.

Nicknames with overlapping used time periods may be determined not to be the identical user from the plurality of nicknames.

The weight values may be calculated through a genetic algorithm.

According to another embodiment, an apparatus for extracting nicknames of the same user includes: a posting receiver that receives at least one posting uploaded to an online community; a feature information extractor that extracts at least one feature information for identifying a posting writer who writes the posting, from the posting; and an identical user extractor that extracts nicknames of identical user with the posing writer, from a plurality of nicknames, based on the similarity of feature information with a predetermined reference or greater.

The identical user extractor may select a candidate nickname group by excluding nicknames that are determined not to be the identical user from the plurality of nicknames, and extracts the nicknames of the identical user from the candidate nickname group.

Nicknames with overlapping used time periods may be determined not to be the identical user from the plurality of nicknames.

The feature information extractor may extract at least one of word related feature information for identifying interest information of the posting writer, activity time related feature information of the posting writer, posting related feature information, and communication relationship related feature information between the posting writer and another user.

The word related feature information may include at least one feature word and a frequency in use of the feature word acquired by using morpheme analysis of texts of the posting.

The communication relationship related feature information may include at least one of first nickname feature information that includes information on a nickname that writes a reply comment or expresses empathy with respect to at least one posting written by the posting writer; second nickname feature information that includes information on a nickname of a writer who writes a posting in response to which the posting writer writes a reply comment or expresses empathy; and third nickname feature information that includes combination of the first nickname feature information and the second nickname feature information.

According to another embodiment, an apparatus for extracting nicknames of the identical user includes: a posting receiver that receives at least one posting uploaded to an online community; a feature information extractor that extracts at least two kinds of feature information of each posting, among word related feature information for identifying interest information of a posting writer, activity time related feature information of the posting writer, posting related feature information, and communication relationship related feature information between the posting writer and another user; and an identical user extractor that calculates a feature information similarity between a plurality of nicknames, applies different weight values for each of the feature information to the similarity, and extracts nicknames of identical use, based on the feature information similarity with a predetermined reference or greater. The identical user extractor may select a candidate nickname group by excluding nicknames that are determined not to be the identical user from the plurality of nicknames, and extracts the nicknames of identical user from the candidate nickname group.

Nicknames with overlapping used time periods may be determined not to be the identical user from the plurality of nicknames.

The weight values may be calculated through a genetic algorithm.

Advantageous Effects

According to an exemplary embodiment, even if a user changes his or her nickname in an online community, a nickname list of the identical user may be extracted. Thus, behavior data with different nicknames may be collected as data of one person.

According to an exemplary embodiment, a user who abuses anonymity in an online community in which anonymity is guaranteed may be blocked.

MODE FOR INVENTION

Figure 1:
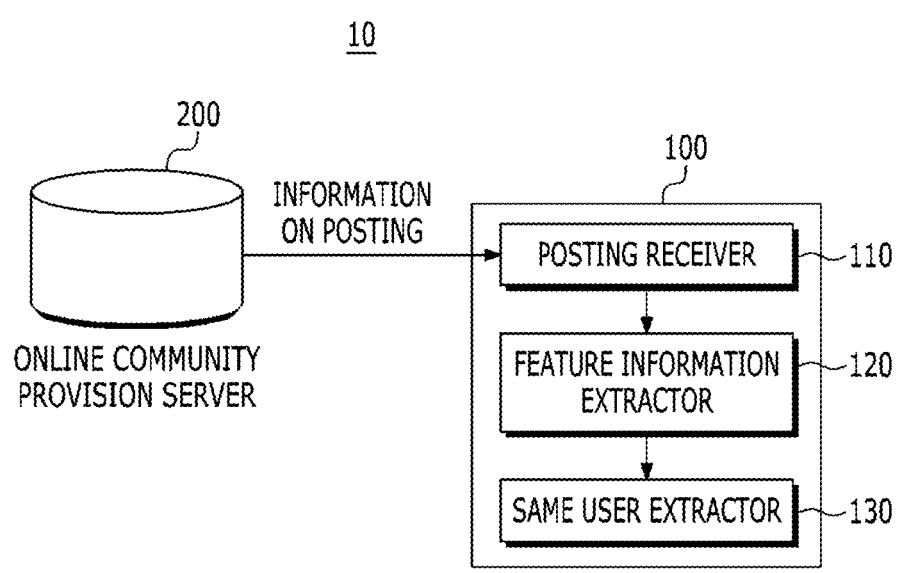
FIG. 1 is a schematic diagram of a system of tracking the identical user according to an exemplary embodiment.

In the following detailed description, only certain exemplary embodiments have been shown and described, simply by way of illustration. As those skilled in the art would realize, the described embodiments may be modified in various different ways, all without departing from the spirit or scope. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, an online community may be configured in such a way that a user writes and uploads a posting on a message board that is mainly open according to a specific subject, and a user interested in a corresponding subject writes a reply comment to the posting, expresses empathy to the posting, or shares the posting with other communities.

As a nickname is changeable in an online community, identity continuity is not guaranteed. Therefore, a method of extracting identical user in case of nickname change will be described and the present invention is not limited thereto. The present invention may also be extended to a method of extracting the identical user when one user can make a plurality of accounts and use a social network service (SNS) with each of the generated accounts.

A method and apparatus for extracting the identical user, to be described below, may be used as a method of evaluating anonymity level when a nickname is changed in an online community.

Because anonymity is guaranteed at a predetermined level in an online community, users are more freely capable of expressing their opinions. There is the possibility that a user may be identified through the personal information revealed by the user in the online community. Thus, users who are reluctant to expose their identities change their nicknames in order to ensure their anonymity. In this regard, a level identified as the identical user by tracking nicknames may be quantitatively analyzed, and a reference for guaranteeing anonymity may be provided.

The method and apparatus for extracting the identical user, to be described below, may be used as a method of preventing cyber bullying that abuses anonymity guarantee in an online community. That is, the identical user may be identified by tracking nicknames to systematically block users who abuse anonymity guarantee.

FIG. 1 is a schematic diagram of a system of tracking the identical user according to an exemplary embodiment.

Referring to FIG. 1, a user track system 10 may include an online community provision server 200 and a nickname extract apparatus 100. The nickname extract apparatus 100 may receive information on postings uploaded to the online community from the online community provision server 200 and extract nicknames of the identical user.

The online community provision server 200 may provide information on the postings uploaded to the online community, to the nickname extract apparatus 100.

The online community provision server 200 may collect postings in the online community for a predetermined time period and may store information indicated by the postings in the form of a database. For example, information indicated by the posting includes a nickname of a posting writer, texts of a posting, time of writing the posting, a nickname of a writer who writes a reply comment to the posting, texts of the reply comment, time of writing the reply comment to the posting, a nickname of a user who shows empathy with the posting, and a nickname of a user who shares the posting.

The nickname extract apparatus 100 may be operated by at least one processor and may include a posting receiver 110, a feature information extractor 120, and an identical user extractor 130.

The posting receiver 110 may receive postings uploaded to a message board opened in an online community from the online community provision server 200. According to the present exemplary embodiment, postings may include a general message, and a reply comment expressing an opinion of an online community user in the form of a short sentence, an emoticon, or the like with respect to the general message. The general message includes at least one of information of a text and an image as well as a title written on a message board.

The feature information extractor 120 may extract feature information for identifying a user (writer) who writes a posting from the posting received from the posting receiver 110. The feature information extracted by the feature information extractor 120 may have various types.

The feature information extractor 120 may extract feature of writing style contained in a posting, feature of communication relationship between users from a reply comment/empathy expression/sharing information with another user with respect to the posting, feature of community activity time from information on time of uploading the posting, and feature of posting by using a length of the posting/the number of used words/the number of emoticons/the number of image updating times/image information. The feature information extractor 120 may identify a unique behavior pattern of a user by using the features extracted from the posting.

According to an exemplary embodiment, the feature information extractor 120 may extract a word feature. The online community user may write a posting including a general message and a reply comment. The posting may represent a unique feature of the user, such as an interest and user preference. The feature information extractor 120 may perform morpheme analysis on a posting title, posting content, and a posting reply comment to extract feature words. The extracted feature words reflect unique feature of a user is reflected.

According to an exemplary embodiment, the feature information extractor 120 may extract an activity time feature. The online community user's activity time may be different depending on a life style. For example, office workers may mainly access a community during lunch time or commuting time, or after work. Students may have different activity time patterns of the community during semester and vacation. The feature information extractor 120 may extract information on time of writing a posting including a general message and a reply comment.

According to an exemplary embodiment, the feature information extractor 120 may extract a posting feature. The online community user may have different posting use patterns depending on his or her personality. For example, the online community user may mainly upload an image, write long sentences, or write only a reply comment without uploading a general message, and so on. The feature information extractor 120 may extract a text length in a posting, the number of used words, the number of emoticons, the number of image updating times, and image information.

According to an exemplary embodiment, the feature information extractor 120 may extract a communication relationship feature. An online community may not have obvious friend making, follower/following, and the like present in a social network service (SNS). Accordingly, a relationship between users may be indirectly checked through general messages and reply comments tagged to the general messages. As online community activity time is increased, there are users who interact with each other through writing reply comments. The writer nickname tagged the posting may be remained as it was even after the writer's nickname is changed. The feature information extractor 120 may extract a list of nicknames that include a nickname of writing a reply comment, a nickname of showing empathy, or a nickname of sharing a posting with other communities, with respect to the posting written by certain nickname user. And the feature information extractor 120 may extract a list of writer nicknames of postings to which each nickname user writes a reply comment, expresses empathy, or shares. The feature information extractor 120 may extract communication relationship information between users, using the list of nicknames extracted from certain nickname user's posting and the list of writer nicknames of postings to which the certain nickname user responds.

The identical user extractor 130 may extract a nickname group that is predictable to be used by the identical user from a plurality of nickname sets, using at least one feature information among various feature information extracted by the feature information extractor 120.

According to an exemplary embodiment, the identical user extractor 130 may exclude a nickname group that is determined not to be used by the identical from the plurality of nickname sets using the feature information, then extract the nickname group predicted to be used by the identical user.

That is, because the identical user is not capable of using two or more different nicknames at the same time, nickname groups with overlapping used time periods may be determined not to be used by the same user. The nickname groups with overlapping used time periods may be excluded, then a candidate nickname group predicted to be used by the same user may be determined.

The identical user extractor 130 may calculate a feature information similarity between any one nickname user and each of a plurality of nickname users in a candidate nickname group predicted to be the same user.

The identical user extractor 130 may determine that nicknames having similar feature information with a predetermined reference or greater, are used by the identical user. The identical user extractor 130 may use at least one feature information of the word related feature information, the activity time related feature information, the posting related feature information, and the communication relationship related feature information, which are extracted by the feature information extractor 120.

According to an exemplary embodiment, the identical user extractor 130 may set weight values with respect to the word related feature information, the activity time related feature information, the posting related feature, and the communication relationship related feature information, which are extracted by the feature information extractor 120. The identical user extractor 130 may calculate the weight sum, and also determine that nicknames having similar feature information with a predetermined reference or greater, are used by the same user.

According to a type of feature information, some feature information may reflect unique characteristic of an actual user with very high accuracy. On the other hand, other feature information may not reflect unique characteristic of an actual user with satisfied accuracy. Accordingly, the identical user extractor 130 may apply weight values of different parameters to the word related feature information, the activity time related feature information, the posting related feature information, and the communication relationship related feature information to acquire a high reliable result.

The identical user extractor 130 may extract an optimal parameter through genetic algorithms (GA). First, the identical user extractor 130 may randomly select 50 objects by arbitrarily setting weight values to respective pieces of feature information, and generate an initial generation. In addition, in each operation, suitability degrees may be determined for respective objects, and in this regard, accuracy obtained by applying weight values allocated to the respective objects may be determined as a suitability degree of a corresponding object.

Then, to leave behind descendant of each object, selecting, mating, and mutation methods are selected. The selecting refers to transmission of ten high-ranking objects with a high suitability degree to a next generation. The mating refers to matching of 30 objects among the remaining objects except for the ten high-ranking objects to make a pair and mixing of weight values half and half. In addition, arbitrary feature information may be randomly changed with respect to the remaining ten objects on which the selecting and the mating are not performed.

The mentioned procedure may be repeated several times or several tens of times, and then, an object with the highest suitability degree may be used to set an optimal parameter with respect to feature information.

As such, the nickname extract apparatus 100 according to an exemplary embodiment may extract a list of nicknames of the identical user even if the user changes his or her nickname in an online community. Even if the user acts on the online community with different nicknames, it is possible to collect data continuously as the same person.

Figure 2:
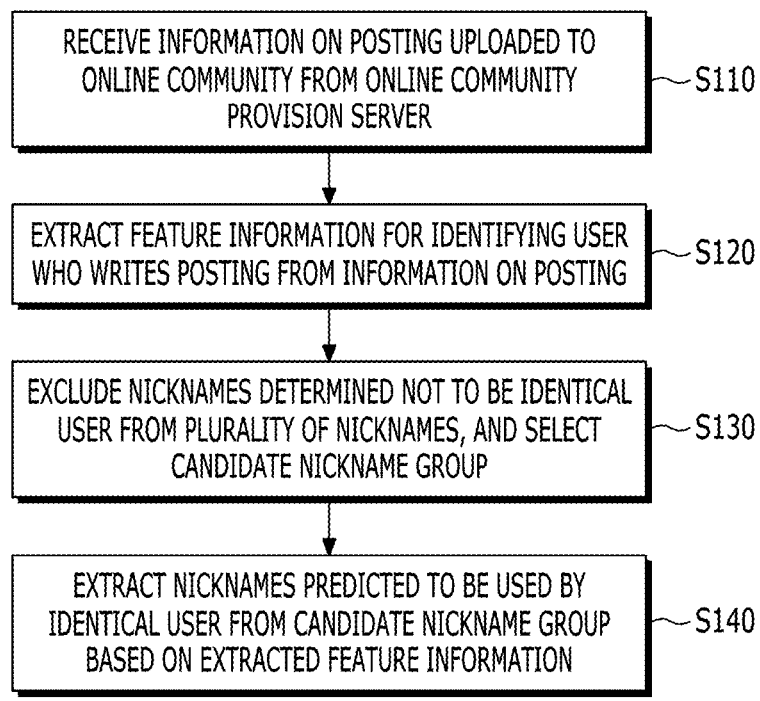
FIG. 2 is a flowchart of a method of extracting a nickname user predicted as the identical user by a nickname extract apparatus according to an exemplary embodiment.

FIG. 2 is a flowchart of a method of extracting a nickname user predicted as the identical user by a nickname extract apparatus according to an exemplary embodiment.

The nickname extract apparatus 100 may receive information on a posting uploaded to an online community from the online community provision server 200 (S110).

The nickname extract apparatus 100 may extract feature information for identifying a user (a posting writer) who writes a posting from the posting information (S120). The feature information extracted by the nickname extract apparatus 100 may have various types. For example, the nickname extract apparatus 100 may extract word related feature information which shows a writer's unique feature, such as an interest of a writer and user preference, feature information on time of writing a posting, posting related feature information, and feature information which shows communication relation with other users.

The word related feature information may be extracted by morpheme analysis on a posting title, posting content, and a reply comment to a posting. The posting related feature information may be extracted using a text length in a posting, the number of used words, the number of emoticons, the number of image updating times, and an average and variance value of image information. The communication relationship related feature information may be acquired by extracting a list of nicknames that include a nickname of writing a reply comment, a nickname of showing empathy, or a nickname of sharing a posting with other communities, with respect to the posting written by one nickname user. And the communication relationship related feature information may be acquired by extracting a list of writer nicknames of postings to which each nickname user writes a reply comment, expresses empathy, or shares.

The nickname extract apparatus 100 may exclude nicknames that is determined not to be the identical user from a plurality of nicknames, and select a candidate nickname group (S130).

Because the identical user is not capable of using two or more different nicknames at the same time, nickname groups with overlapping used time periods may be determined not to be used by the same user. The nickname groups with overlapping used time periods may be excluded, then a candidate nickname group predicted to be used by the same user may be determined.

In the case of a use interval $NT_{Ni}=[t_p, t_q]$ with respect to any one element $N_i$ among an entire nickname set $N=\{N_1, N_2, \ldots, N_m\}$, a candidate nickname group $CS_{Ni}$ may be defined according to Equation 1 below.

$$CS_{Ni}=\{N_j \in N | NT_{Ni} \cap NT_{Nj}=\emptyset\}$$ [Equation 1]

In addition, the nickname extract apparatus 100 may extract nicknames predicted to be used by the identical user from the candidate nickname group based on the extracted feature information (S140).

The nickname extract apparatus 100 may calculate a feature information similarity between any one nickname user and each of nickname users in a candidate nickname group predicted to be the same user.

According to the present exemplary embodiment, the nickname extract apparatus 100 may calculate a similarity using a Jaccard similarity with respect to word related feature information and communication relationship related feature information. The nickname extract apparatus 100 may calculate a similarity using a dynamic time warping algorithm with respect to activity time feature information.

The nickname extract apparatus 100 may calculate a similarity using an average and variance value with respect to posting related feature information, as shown in Table 1 below.

TABLE 1

| Type of feature information | Detailed feature information | Metric |
|---|---|---|
| Word related feature information | feature word in General posting title | Jaccard similarity |
| | feature word in General posting content | Jaccard similarity |
| | feature word in Reply comment | Jaccard similarity |
| Activity time related feature information | writing time of General posting | Dynamic time warping (DTW) |
| | writing time of Reply comment | Dynamic time warping (DTW) |
| Posting related feature information | General posting/reply comment writing ratio | Ratio |
| | title length of General posting | Average Variance |
| | content length of General posting | Average Variance |
| | word number of General posting title | Average Variance |
| | word number of General posting content | Average Variance |
| | number of Reply comments | Average Variance |
| | number of Images | Average Variance |
| | number of hits | Average Variance |
| Communication relationship related feature information | List of other users who respond to posting of a certain user (first list) | Jaccard similarity |
| | List of writers of postings to which a certain user responds (second list) | Jaccard similarity |
| | Union of first list and second list | Jaccard similarity |
| | Intersection of first list and second list | Jaccard similarity |

The nickname extract apparatus 100 may extract nicknames having similar feature information with a predetermined reference or greater, from nickname users in the candidate nickname group. The nickname extract apparatus 100 may determine that the extracted nicknames having similar feature information are used by the same user.

As shown in Table 1 above, with respect to detailed feature information (total 24) F={f1, f2, . . . , f24} included in the word related feature information, the activity time related feature information, the posting related feature information, and the communication relationship related feature information, similarity degrees between $N_i$ and candidate nicknames belonging to $CS_{Ni}$ may be calculated as key values. A function which returns a nickname set using the similarity degrees may be defined as $sim_{fi}(CS_{Ni})$.

In this case, a candidate set acquired from any one specific feature information $f_j$ may be defined according to Equation 2 below.

$$CS_{N_i,f_j} = sim_{f_j}(CS_{N_i})$$ [Equation 2]

In addition, a final candidate set $SubCS_{Ni,fj}$ may be defined as a set including k high-ranking nicknames with a high similarity degree among nicknames belonging to the candidate set.

According to another exemplary embodiment, the identical user extractor 130 may set weight values with respect to the word related feature information, the activity time related feature information, the posting related feature, and the communication relationship related feature information, which are extracted by the feature information extractor 120. The identical user extractor 130 may calculate the weight sum, and also determine that nicknames having feature information of which has a similarity degree with a predetermined reference or greater, are used by the same user. In this case, the identical user extractor 130 may extract optimal weight values through a genetic algorithm (GA) to acquire a result with high reliability.

Figure 3:
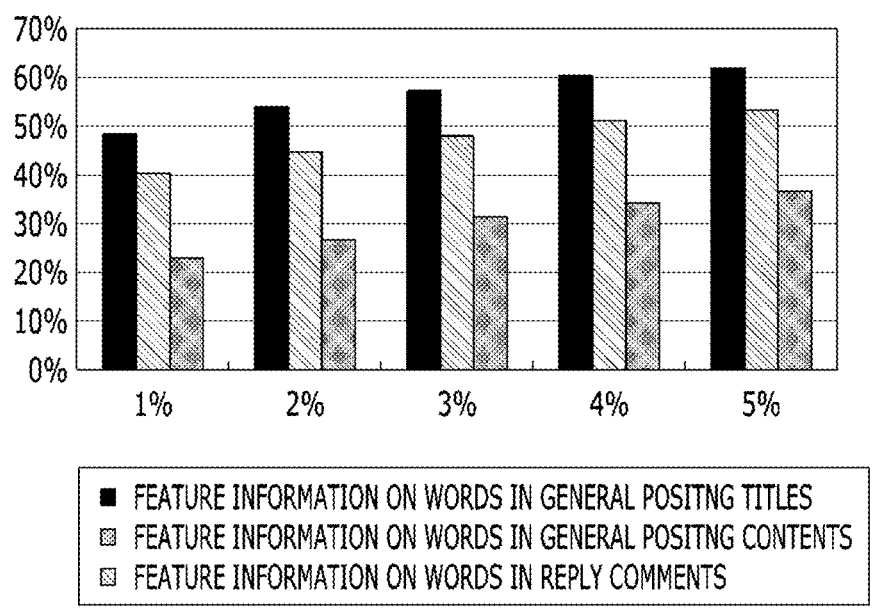
FIG. 3 is a diagram showing accuracy of extraction results predicted as the identical user using word related feature information by a nickname extract apparatus according to an exemplary embodiment.
Figure 4:
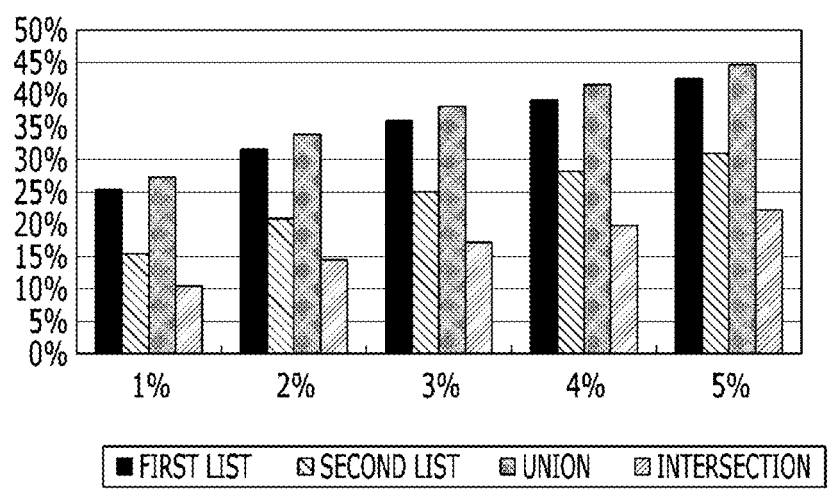
FIG. 4 is a diagram showing accuracy of extraction results predicted as the identical user using communication relationship related feature information by a nickname extract apparatus according to an exemplary embodiment.

FIG. 3 is a diagram showing accuracy of extraction results predicted as the identical user using word related feature information by a nickname extract apparatus according to an exemplary embodiment. FIG. 4 is a diagram showing accuracy of extraction results predicted as the identical user using communication relationship related feature information by a nickname extract apparatus according to an exemplary embodiment.

According to an exemplary embodiment, accuracy of assumption of the identical user with respect to $N_i$ may be calculated according to Equation 3 below.

$$Acc_{N_i} = \frac{SubCS_{N_i,f_j} \cap Sol_{N_i}}{SubCS_{N_i,f_j}}$$ [Equation 3]

Here, $Sol_{Ni}$ is a set of nicknames that are actually used by the identical user.

Referring to FIG. 3, the accuracy assumed as the identical user shows high in order of feature information on words in a title of a general posting, feature information on words in content of the general posting, and feature information on words in a reply comment.

Generally, words in a general posting may make high accuracy compared with words in a reply comment because a title or content of the general posting generally include words representing user interests or user preference and expressing an obvious personality for each person.

On the other hand, words in a reply comment make relatively low accuracy because a reply comment mainly is written to express an opinion about content of a general posting.

Referring to FIG. 4, feature information extracted from first list may provide higher accuracy than feature information extracted from second list. The first list is a list of other users who write a reply comment, expresses empathy, or shares the posting with other communities, with respect to the posting written by a certain nickname user. The second list is a list of writers of other postings that the certain nickname user responds to. The feature information of the first list may include accumulated data compared with feature information of the second list. Thus, it may be interpreted that the feature information of the first list may have higher accuracy for identifying the certain nickname.

Feature information extracted from a union list of the first and second lists may have higher accuracy than feature information extracted from an intersection list of the first and second lists. Similarly, the feature information of the union list includes a larger amount of accumulated data compared with the feature information of the intersection list. Thus, it may be interpreted that the feature information of union list may have higher accuracy for identifying the certain nickname.

Figure 5:
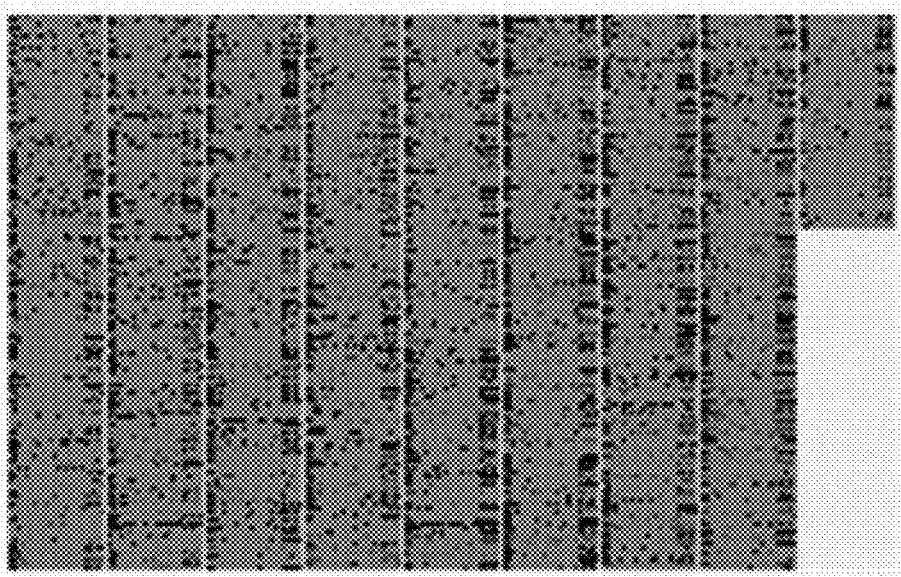
FIGS. 5 and 6 show an exemplary extraction result of the identical user using feature information by a nickname extract apparatus according to an exemplary embodiment.
Figure 5:
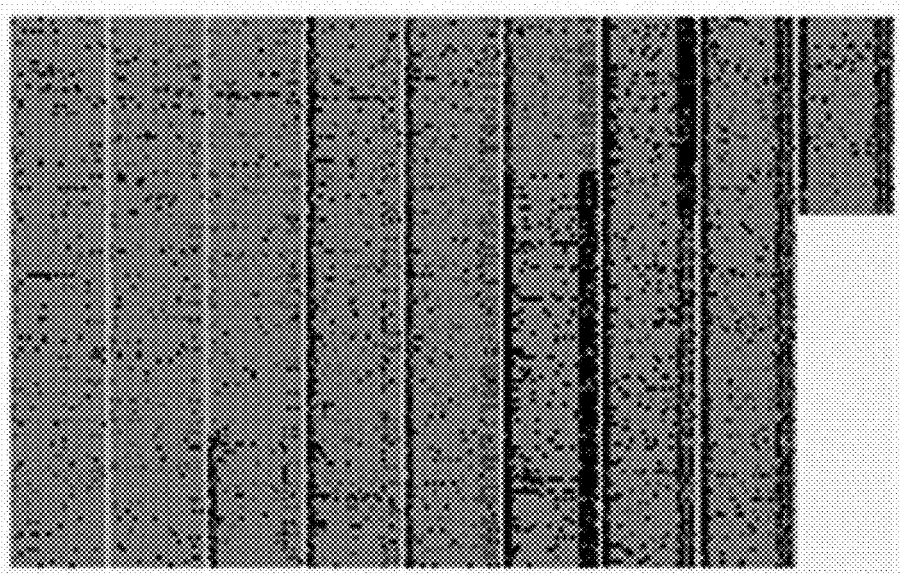
Figure 6:
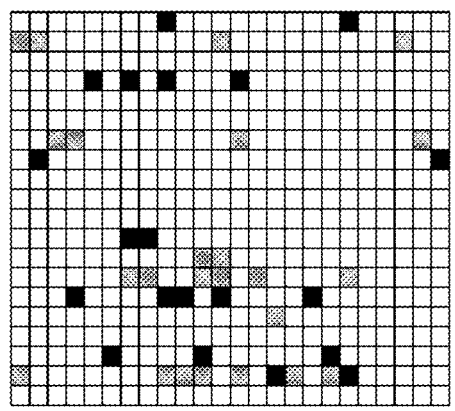
Figure 6:
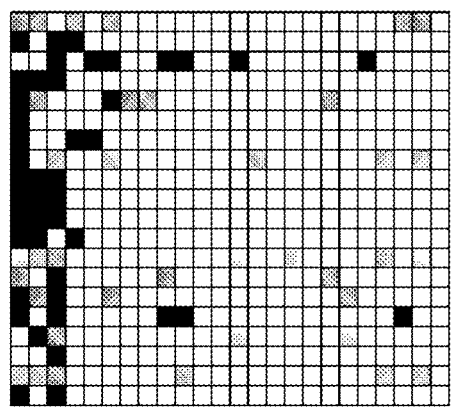
Figure 6:
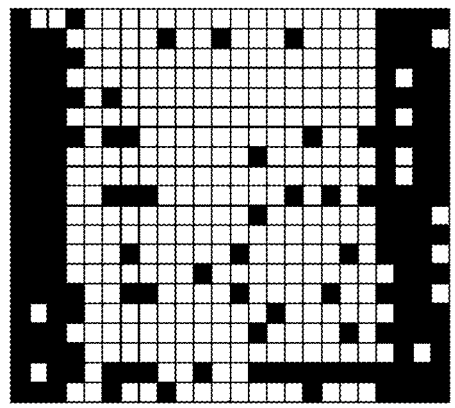
Figure 6:
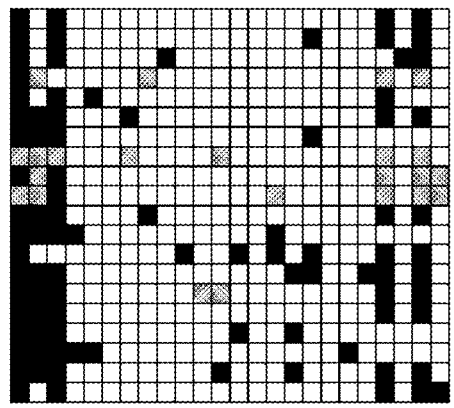

FIGS. 5 and 6 show an exemplary extraction result of the identical user using feature information by a nickname extract apparatus according to an exemplary embodiment.

FIG. 5 shows a hitmap that visualizes accuracy of each feature information for a nickname. In the hitmap, a column is a nickname and a row is feature information items. Each cell refers to a percentage of correct answers, and a dark cell refers to a high percentage of correct answers with respect to feature information. In general, it may be seen that word related feature information and communication relationship related feature information have high accuracy.

FIG. 6 shows a result clustered through an X-means algorithm for detailed analysis of the result of FIG. 5.

Cluster 1 shows a result that it is not possible to identify a nickname because feature information does not sufficiently reflect nickname identification information.

Cluster 2 shows a result that a percentage of correct answers is high with respect to word related feature information.

Clusters 3 and 4 show a result that a percentage of correct answers is high with respect to word related feature information and communication relationship related feature information items.

As seen from the results of FIGS. 3 to 6, accuracy of the identical user extraction may be different for respective pieces of feature information.

Accordingly, the nickname extract apparatus 100 according to another exemplary embodiment may apply different weight values to respective pieces of feature information and may predicts the identical user by calculating the weight sum of the feature information items.

Figure 7:
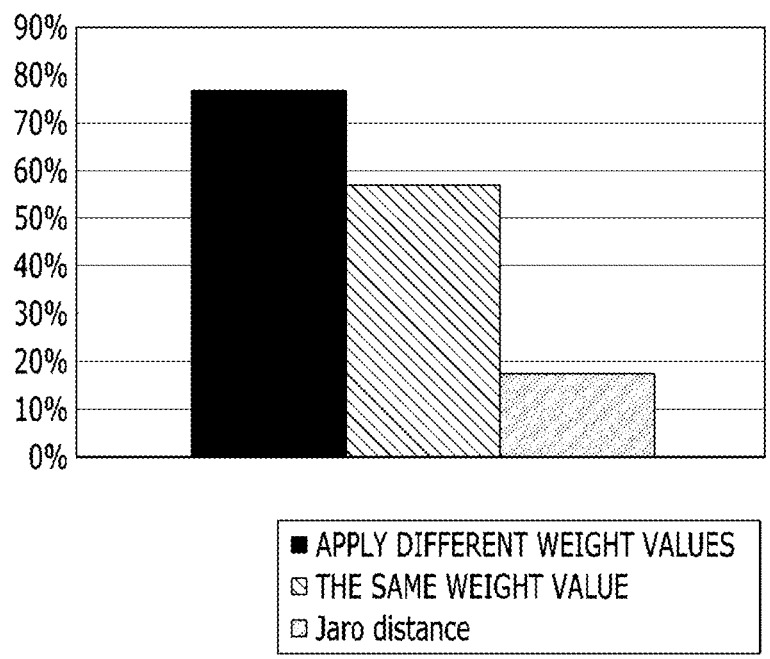
FIG. 7 shows a comparison result of first exemplary embodiments, second exemplary embodiments and the conventional art.

FIG. 7 shows a comparison result of first exemplary embodiments, second exemplary embodiments and the conventional art.

Referring to FIG. 7, in case of extracting identical user by calculating a feature information similarity using the conventional art (jaro distance), the accuracy of the result is relatively low, i.e., about 17%.

On the other hand, in case of extracting identical user by applying the same weight value to a plurality of feature information which is extracted from a posting by the nickname extract apparatus according to the first exemplary embodiment, accuracy of the result is about 55% and is improved compared with the conventional art.

In case of extracting identical user by applying different weight values to a plurality of feature information which is extracted from a posting by the nickname extract apparatus according to the second exemplary embodiment, accuracy of the result is about 75% and is further improved compared with the conventional art and the first exemplary embodiment.

As such, according to an exemplary embodiment, different nicknames used by identical user may be extracted in an online community which allows a nickname change. Therefore a profiling of anonymous person may also be possible in an online community in which anonymity is guaranteed. Suitable information for analysis of corporate decision or social phenomenon may be acquired from the profiling result.

The aforementioned exemplary embodiment is not always embodied only through a device and a method, and may also be embodied through a program for executing a function corresponding to a configuration of an exemplary embodiment or a recording medium with the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of extracting nicknames of identical user by an apparatus operated by at least one processor, the method comprising:
   receiving a posting uploaded to an online community from a server;
   extracting at least one feature information for identifying a posting writer who writes the posting, from the posting;
   determining first nicknames whose used time periods overlap with a used time period of a nickname of the posting writer, from among a plurality of nicknames;
   selecting a candidate nickname group from among the plurality of nicknames, the candidate nickname group including second nicknames other than the first nicknames among the plurality of nicknames; and
   extracting, as a nickname of identical user with the posting writer, a second nickname having feature information whose similarity with the feature information for identifying the posting writer is greater than or equal to a predetermined reference among the second nicknames.

2. The method of claim 1, wherein
   the feature information for identifying the posting writer includes word related feature information for identifying interest information of the posting writer, activity time related feature information of the posting writer, posting related feature information of the posting writer, and communication relationship related feature information between the posting writer and another user, and
   the feature information of each of the second nicknames includes word related feature information for identifying interest information of a user corresponding to each of the second nicknames, activity time related feature information of the user, posting related feature information of the user, and communication relationship related feature information between the user and another user.

3. The method of claim 2, wherein
   the word related feature information includes
   at least one feature word and a frequency in use of the feature word acquired by using morpheme analysis of texts of the posting.

4. The method of claim 2, wherein
   the communication relationship related feature information includes at least one of
   first nickname feature information that includes information on a nickname that writes a reply comment or expresses empathy with respect to at least one posting written by the posting writer,
   second nickname feature information that includes information on a nickname of a writer who writes a posting in response to which the posting writer writes a reply comment or expresses empathy, and
   third nickname feature information that includes combination of the first nickname feature information and the second nickname feature information.

5. A method of extracting nicknames of the identical user by an apparatus operated by at least one processor, the method comprising:
   receiving postings uploaded to an online community from a server;
   extracting feature information from each posting, the feature information of each posting including word related feature information for identifying interest information of a posting writer, activity time related feature information of the posting writer, posting related feature information, and communication relationship related feature information between the posting writer and another user;

calculating a feature information similarity between a plurality of nicknames corresponding to writers of the postings based on a weight sum calculated by applying different weight values to the word related feature information, the activity time related feature information, the posting related feature information, and the communication relationship related feature information; and extracting, as nicknames of identical user, nicknames having the similarity of feature information being greater than or equal to a predetermined reference among the plurality of nicknames corresponding to writers of the postings.

6. The method of claim 5, further comprising:

selecting a candidate nickname group by excluding nicknames whose used time periods overlapping with a used time period of a target nickname from the plurality of nicknames, wherein the extracting the nicknames includes extracting the nicknames of identical user from the candidate nickname group.

7. The method of claim 5, wherein the weight values are calculated through a genetic algorithm.

8. An apparatus for extracting nicknames of the same user, the apparatus comprising:

a posting receiver that receives at least one posting uploaded to an online community;

a feature information extractor that extracts at least one feature information for identifying a posting writer who writes the posting, from the posting; and an identical user extractor that determines first nicknames whose used time periods overlap with a used time period of a nickname of the posting writer, from among a plurality of nicknames, selecting a candidate nickname group from among the plurality of nicknames, the candidate nickname group including second nicknames other than the first nicknames among the plurality of nicknames, and extracts, as a nickname of identical user with the posting writer, a second nickname having feature information whose similarity with the feature information for identifying the posting writer is greater than or equal to a predetermined reference among the second nicknames.

9. The apparatus of claim 8, wherein the feature information for identifying the posting writer includes word related feature information for identifying interest information of the posting writer, activity time related feature information of the posting writer, posting related feature information of the posting writer, and communication relationship related feature information between the posting writer and another user, and the feature information of each of the second nicknames includes word related feature information for identifying interest information of a user corresponding to each of the second nicknames, activity time related feature information of the user, posting related feature information of the user, and communication relationship related feature information between the user and another user.

10. The apparatus of claim 9, wherein the word related feature information includes at least one feature word and a frequency in use of the feature word acquired by using morpheme analysis of texts of the posting.

11. The apparatus of claim 9, wherein the communication relationship related feature information includes at least one of first nickname feature information that includes information on a nickname that writes a reply comment or expresses empathy with respect to at least one posting written by the posting writer, second nickname feature information that includes information on a nickname of a writer who writes a posting in response to which the posting writer writes a reply comment or expresses empathy, and third nickname feature information that includes combination of the first nickname feature information and the second nickname feature information.

12. An apparatus for extracting nicknames of the identical user, the apparatus comprising:

a posting receiver that receives at least one posting uploaded to an online community;

a feature information extractor that extracts feature information of each posting, feature information of each posting including word related feature information for identifying interest information of a posting writer, activity time related feature information of the posting writer, posting related feature information, and communication relationship related feature information between the posting writer and another user; and an identical user extractor that calculates a feature information similarity between a plurality of nicknames based on a weight sum calculated by applying different weight values to the word related feature information, the activity time related feature information, the posting related feature information, and the communication relationship related feature information, and extracts, as nicknames of identical use, nicknames having the feature information similarity being greater than or equal to a predetermined reference among the plurality of nicknames.

13. The apparatus of claim 12, wherein the identical user extractor selects a candidate nickname group by excluding nicknames whose used time periods overlapping with a used time period of a target nickname from the plurality of nicknames, and extracts the nicknames of identical user from the candidate nickname group.

14. The apparatus of claim 12, wherein the weight values are calculated through a genetic algorithm.

* * * * *